(12) United States Patent
Tsutsumi (10) Patent No.: US 10,712,841 B2
(45) Date of Patent: Jul. 14, 2020

(54) DISPLAY CONTROL DEVICE, DISPLAY CONTROL SYSTEM, DISPLAY CONTROL METHOD, AND STORAGE MEDIUM HAVING STORED THEREON DISPLAY CONTROL PROGRAM

(71) Applicant: CASIO COMPUTER CO., LTD., Shibuya-ku, Tokyo (JP)

(72) Inventor: Katsunori Tsutsumi, Tachikawa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 93 days.

(21) Appl. No.: 15/883,597

(22) Filed: Jan. 30, 2018

(65) Prior Publication Data
US 2018/0275774 A1 Sep. 27, 2018

(30) Foreign Application Priority Data
Mar. 22, 2017 (JP) ................................ 2017-056309

(51) Int. Cl.
| | |
|---|---|
| G06F 3/038 | (2013.01) |
| G03B 17/54 | (2006.01) |
| G06F 3/0354 | (2013.01) |
| G06F 3/033 | (2013.01) |
| G03B 21/26 | (2006.01) |

(52) U.S. Cl.
CPC ........... *G06F 3/0386* (2013.01); *G03B 17/54* (2013.01); *G03B 21/26* (2013.01); *G06F 3/033* (2013.01); *G06F 3/03542* (2013.01)

(58) Field of Classification Search
CPC .... G06F 3/0386; G06F 3/033; G06F 3/03542; G06F 3/147; G06F 3/1407; G03B 21/26; G03B 17/54
See application file for complete search history.

(56) References Cited

U.S. PATENT DOCUMENTS

| | | | | |
|---|---|---|---|---|
| 2004/0239653 | A1* | 12/2004 | Stuerzlinger | ........... G06F 3/038 345/183 |
| 2008/0024443 | A1* | 1/2008 | Horikiri | ................ G06F 3/0386 345/157 |

(Continued)

FOREIGN PATENT DOCUMENTS

| | | |
|---|---|---|
| JP | 2004348577 A | 12/2004 |
| JP | 2007058497 A | 3/2007 |

(Continued)

*Primary Examiner* — Brent D Castiaux
(74) *Attorney, Agent, or Firm* — Holtz, Holtz & Volek PC (57) ABSTRACT

Display operation of a display device is controlled in association with a pointer device. A display control system that includes: a display device for displaying information on a display surface; a control device for controlling the display of the display device; and an image acquisition device for acquiring an image of the display device including a light beam from a pointer device capable of emitting a light beam is proposed. The control device includes: an acquisition unit for acquiring the image from the image acquisition device; a feature identification unit for identifying a feature of the light beam included in the image; and a display control unit for performing display operation of the display device based on the feature and state of the light beam. A corresponding display control method and display control program are proposed, too.

8 Claims, 7 Drawing Sheets

(56) References Cited

U.S. PATENT DOCUMENTS

| | | | | |
|---|---|---|---|---|
| 2011/0119638 A1* | 5/2011 | Forutanpour | ....... | G06F 3/03542 715/863 |
| 2013/0249796 A1* | 9/2013 | Sugishita | .............. | G06F 3/0346 345/158 |
| 2015/0009138 A1* | 1/2015 | Narita | ................. | G06F 3/03542 345/157 |
| 2016/0156892 A1* | 6/2016 | Sumiyoshi | ............. | G03B 21/14 348/502 |

FOREIGN PATENT DOCUMENTS

| | | |
|---|---|---|
| JP | 2011133541 A | 7/2011 |
| JP | 2016092779 A | 5/2016 |
| JP | 2016212291 A | 12/2016 |

\* cited by examiner

DISPLAY CONTROL DEVICE, DISPLAY CONTROL SYSTEM, DISPLAY CONTROL METHOD, AND STORAGE MEDIUM HAVING STORED THEREON DISPLAY CONTROL PROGRAM

CROSS-REFERENCE TO RELATED APPLICATIONS

This application is based upon and claims the benefit of priority from Japanese Patent Application No. 2017-056309, the entire contents of which are incorporated herein by reference.

BACKGROUND OF THE INVENTION

1. Field of the Invention

The present invention relates to a display control device, a display control system for controlling display operation of a display device, a display control method, and a storage medium having stored thereon a display control program.

2. Description of the Related Art

In a presentation using a display device such as a projector, a pointing device such as a pointer for pointing at a display surface is typically used. For example, Japanese Patent Application Laid-Open No. 2004-348577 discloses a technique of, when performing operation of pointing at the same display surface using a plurality of pointing devices in an information display system including a projector, preventing unauthorized operation by registering each pointing device in an information processing device and authenticating it.

In the system described in Japanese Patent Application Laid-Open No. 2004-348577, each pointing device is used only to point at any position on the display surface. User-friendliness is, however, expected to improve by enabling operation other than pointing in association with the operation of each pointing device, e.g. operating the display screen.

SUMMARY OF THE INVENTION

An aspect of the present invention is a display control device including a processor, wherein the processor is configured to: acquire an image including a light beam emitted from a pointer device and displayed on a screen; identify a feature of the light beam included in the image; specify a state of the light beam; and control a display device to perform a predetermined display operation, based on the feature of the light beam and the state of the light beam.

Another aspect of the present invention is a display control method used in a display control device, the display control method including: a process of acquiring an image of a screen, the image including a light beam emitted from a pointer device; a process of identifying a feature of the light beam included in the image; a process of specifying a state of the light beam; and a process of performing a display operation of a display device, based on the feature of the light beam and the state of the light beam.

Another aspect of the present invention is a non-transitory computer-readable storage medium having stored thereon a program executable by a computer of a control device, the program controlling the computer to perform functions including: acquiring an image of a screen, the image including a light beam emitted from a pointer device; identifying a feature of the light beam included in the image; specifying a state of the light beam; and performing a display operation of a display device, based on the feature of the light beam and the state of the light beam.

DETAILED DESCRIPTION OF THE INVENTION

An embodiment of the present invention is described below, with reference to drawings.

Figure 1:
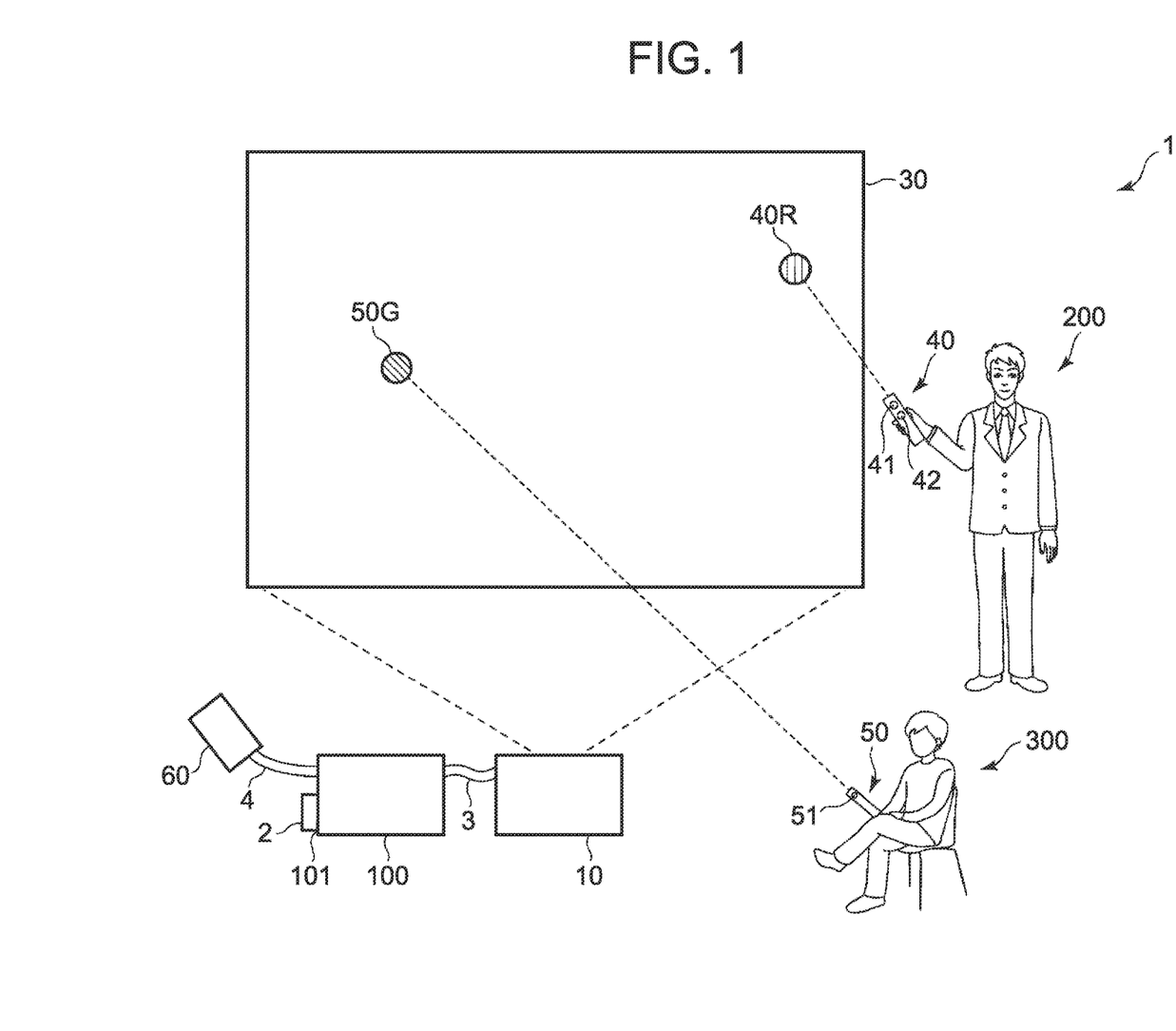
FIG. 1 is a diagram illustrating an example of an overall projection system including a control device in an embodiment of the present invention.

FIG. 1 is a diagram illustrating an example of an overall projection system (display control system) 1 including a control device 100 in this embodiment. The control device 100 is a control box, a personal computer, a tablet terminal, a smartphone, or the like. The following description assumes that the control device 100 is a control box. The control device 100 includes a host OS (Windows®, Android®, Linux®, or the like).

The control device 100 has a storage slot 101 for a storage medium 2 (USB memory, SD card, or the like). The storage medium 2 stores presentation materials such as Power-Point®, PDF files, and video files.

The projection system 1 includes a projector 10 and a screen 30 including a projection surface as a display surface. In this embodiment, the projector 10 is a DLP® (Digital Light Processing) projector. The projector 10 is, for example, wiredly connected to the control device 100 via an HDMI® (High-Definition Multimedia Interface) cable 3.

The presentation materials in the storage medium 2 are reproduced by a function in the host OS in the control device 100, and a corresponding image signal or sound signal is output to the projector 10 via the HDMI cable 3. The projector 10, as an image display device, projects a projection image corresponding to the image signal onto the screen 30 whenever necessary. Thus, the control device 100 controls the display operation of the projector 10 as a display device. The projector 10, as an image/sound presentation device, may also output sound corresponding to the sound signal from the below-mentioned speaker unit 19, in addition to the above-mentioned projection. Thus, the control device 100 may control the presentation operation of the projector 10 as a presentation device.

The projection system 1 includes a pointer device including one or more pointers. In this embodiment, the pointer device in the projection system 1 includes a first pointer 40 and a second pointer 50. The first pointer 40 and the second pointer 50 may be general-purpose products. In the example in FIG. 1, a person who gives the presentation (presenter) 200 has the first pointer 40, and a person who receives the presentation (audience) 300 has the second pointer 50.

The first pointer 40 is capable of emitting two different colors of light. The first pointer 40 is provided with two button switches 41 and 42 for switching on and off of the respective light outputs. For example, red light (red light beam) is emitted while the presenter 200 is pressing the first button switch 41, and blue light (blue light beam) is emitted while the presenter 200 is pressing the second button switch 42. The emitted light beam is superimposed on the projection image on the screen 30 as a light spot, and used for indication. The first pointer 40 may emit two types of light that differ in wavelength.

The second pointer 50 is capable of emitting light of a color different from the light emitted from the first pointer 40. The second pointer 50 is provided with a button switch 51 for switching on and off of the light output. For example, green light (green light beam) is emitted while the audience 300 is pressing the button switch 51. The emitted light beam is superimposed on the projection image on the screen 30 as a light spot, and used for indication. The second pointer 50 may emit light that differs in wavelength from the light emitted from the first pointer 40.

The first pointer 40 and the second pointer 50 are each capable of illuminating, blinking, or double-blinking in each color, depending on how long the presenter 200 or the audience 300 presses the button switch 41, 42, or 51, how the presenter 200 or the audience 300 presses the button switch 41, 42, or 51, etc. Alternatively, other button switches may be provided that enable light illumination, blinking, and double-blinking when pressed. The definitions of illumination, blinking, and double-blinking will be given later.

The projection system 1 includes a digital camera 60 as an image acquisition device. The digital camera 60 is positioned at such an angle of view that enables capturing the whole projection surface, with respect to the screen 30. The digital camera 60 is, for example, wiredly connected to the control device 100 via a USB (Universal Serial Bus) cable 4.

The digital camera 60 captures the whole projection surface of the screen 30, i.e. the whole projection image from the projector 10, according to a control signal received from the control device 100 via the USB cable 4. Image data (image signal) obtained as a result of the image capture is sent to the control device 100 via the USB cable 4.

Figure 2:
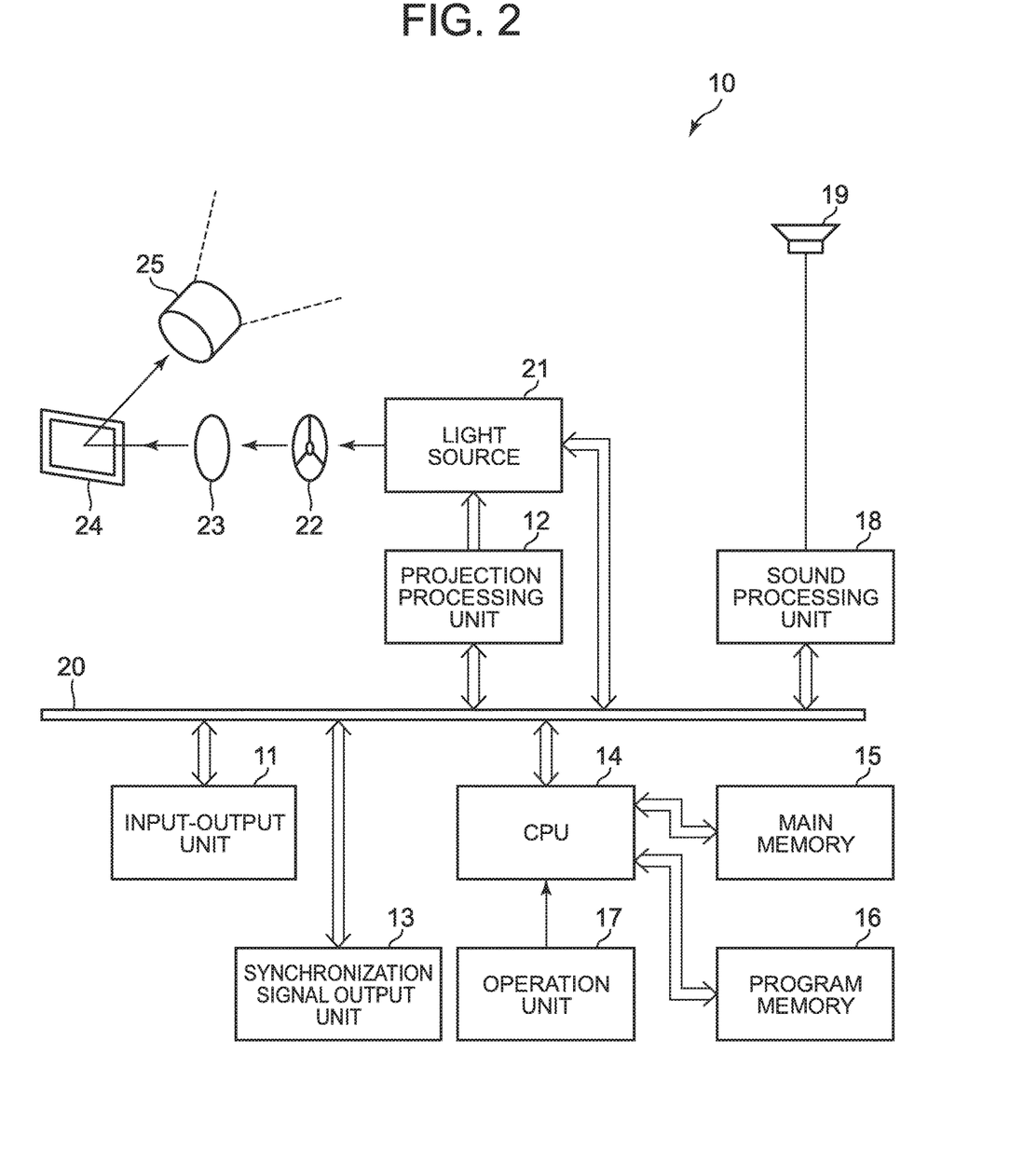
FIG. 2 is a block diagram illustrating an example of a projector.

FIG. 2 is a block diagram illustrating an example of the DLP projector 10. The projector 10 includes an input-output unit 11 and a projection processing unit 12. The input-output unit 11 includes an HDMI terminal for connection to the control device 100, a USB terminal for connection to the digital camera 60, and the like. Image data received from the control device 100 via the input-output unit 11 is digitized according to need, and then sent to the projection processing unit 12 via a bus 20. The projection processing unit 12 converts the received image data into image data of a format suitable for projection, and controls the below-mentioned micromirror element 24 by time division driving through a predetermined frame rate. For example, value of the predetermined frame rate is multiplication of 60 fps, a color component division number, and a display gradation number.

The projector 10 includes a light source 21, a color wheel 22, a shaping lens 23, the micromirror element 24, and a projection lens 25 in this order in its light path. The light source 21 is a light source for emitting white light. The color wheel 22 is a circular color filter plate that rotates fast. For example, the color wheel 22 is divided into three fields of blue (B), red (R), and green (G) by 120 degrees. The micromirror element 24 is, for example, a display element in which several hundred thousand to several million micromirrors are two-dimensionally arranged. The mirror surface of each micromirror can be tilted around the diagonal, by driving an electrode provided below the mirror surface. The micromirror element 24 performs fast on/off operation on the tilt angle of each individual one of the micromirrors for WXGA (Wide Extended Graphics Array) (horizontal 1280 pixels×vertical 800 pixels) as an example, to form an image by their reflection light.

Upon driving by the projector 10, white light emitted from the light source 21 is applied to the field of each color of the fast-rotating color wheel 22 in a time division manner, and light shaped by the shaping lens 23 is applied to the micromirror element 24. For example, in the case of projecting red color, a desired micromirror is on only at the moment when light is incident on the red field of the color wheel 22. In the case of projecting white color, a desired micromirror is always on. Light output from the micromirror element 24 is projected to the outside from the projection lens 25. By projecting each color in a color time division manner in this way, i.e. by switching the color in such a time period that allows the use of an afterimage phenomenon to the naked eyes, a color image resulting from RGB synthesis is projected onto the screen 30.

The above-mentioned structure of the color wheel 22 is an example, and the structure is not limited to the above-mentioned color types, number of colors, and color arrangement. The projector 10 may synthesize a color image in a time division manner using a hybrid light source that combines a semiconductor laser light source and an LED light source, instead of using the light source 21 and the color wheel 22.

Figure 3:
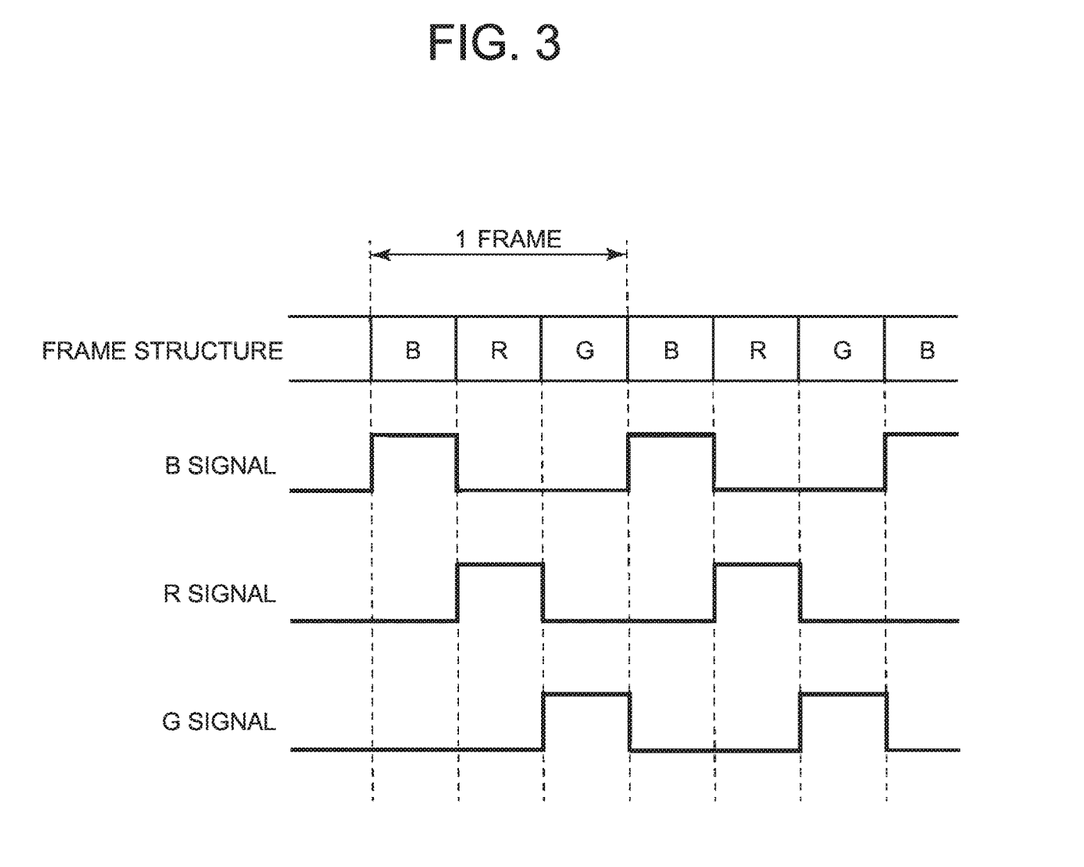
FIG. 3 is a diagram illustrating an example of a wheel synchronization signal.

The projector 10 includes a synchronization signal output unit 13. The synchronization signal output unit 13 outputs a wheel synchronization signal synchronized at the timing when light is incident on the field of each color of the color wheel 22, i.e. a blue synchronization signal (B signal), a red synchronization signal (R signal), or a green synchronization signal (G signal) in this example, to the control device 100 from, for example, the HDMI terminal of the input-output unit 11 via the HDMI cable 3. FIG. 3 is a diagram illustrating an example of the wheel synchronization signal. For example, one color image frame corresponding to ¹⁄₆₀ sec is made up of a blue field, a red field, and a green field, as illustrated in FIG. 3.

A CPU (Central Processing Unit) 14 controls the operation of each circuit having the above-mentioned structure in the projector 10. The CPU 14 is directly connected to a main memory 15 and a program memory 16. The main memory 15 is composed of SRAM (Static Random Access Memory) as an example, and functions as working memory for the CPU 14. The program memory 16 is composed of electrically rewritable nonvolatile memory, and stores operation programs executed by the CPU 14, various standard data, etc. The CPU 14 controls the operation of the projector 10, using the main memory 15 and the program memory 16.

The projector 10 includes an operation unit 17. The operation unit 17 includes a key operation unit provided in the body of the projector 10, and an infrared light reception unit for receiving infrared light from a remote control (not illustrated) of the projector 10. An operation signal of operation by the key operation unit or the remote control is directly output to the CPU 14. The CPU 14 executes each type of projection operation, according to the operation signal from the operation unit 17.

The projector 10 includes a sound processing unit 18 and a speaker unit 19. The sound processing unit 18 is connected to the CPU 14 via the bus 20. The sound processing unit 18 includes a sound source circuit such as a PCM sound source, and converts sound data provided during projection operation to analog and drives the speaker unit 19 to amplify and output the sound or, when necessary, output beep sound or the like.

Figure 4:
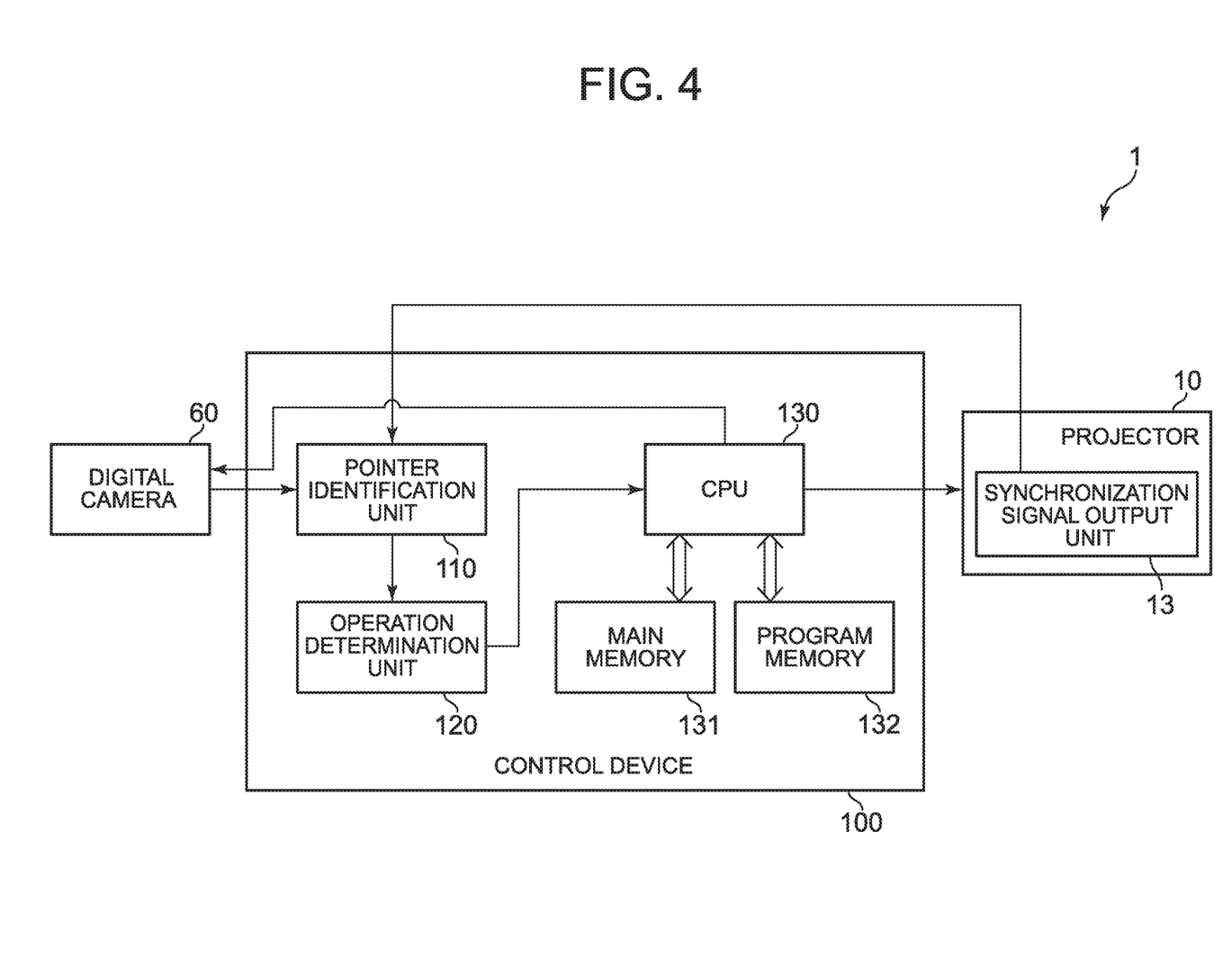
FIG. 4 is a block diagram illustrating an example of the overall projection system including the control device in the embodiment of the present invention.

FIG. 4 is a block diagram illustrating an example of the overall projection system 1 including the control device 100. The control device 100 includes a pointer identification unit 110, an operation determination unit 120, and a CPU 130. Each of the circuits of the pointer identification unit 110 and the operation determination unit 120 is assumed here to be a hardware circuit such as FPGA (Field-Programmable Gate Array) or ASIC (Application Specific Integrated Circuit), although the component may be realized by a CPU.

The pointer identification unit 110 receives the wheel synchronization signal from the synchronization signal output unit 13 in the projector 10. The pointer identification unit 110, as an image acquisition unit, also receives the image signal of the screen 30 captured by the digital camera 60. The pointer identification unit 110, as a feature identification unit and a state specification unit, specifies information about the presence or absence of the light spot of the light beam of each of the first pointer 40 and the second pointer 50 in the captured image and its color (red, blue, or green), light spot display state (illuminating, blinking, or double-blinking), and position coordinate (X, Y), based on the wheel synchronization signal and the image signal.

The operation determination unit 120 determines a control signal to be output by the CPU 130 in order to control the projector 10, based on each type of information of the first pointer 40 and the second pointer 50 recognized by the pointer identification unit 110.

The CPU 130, as a display control unit, outputs a control signal for controlling the display operation of the presentation materials projected by the projector 10, based on the information determined by the operation determination unit 120. The CPU 130 may, as a presentation operation control unit, also output a control signal for controlling the presentation operation such as the volume of sound output from the speaker unit 19 in addition to the above-mentioned display operation control, based on the determination by the operation determination unit 120. The CPU 130, as an imaging control unit, sends an imaging instruction to the digital camera 60.

The CPU 130 is directly connected to a main memory 131 and a program memory 132. The main memory 131 is composed of SRAM as an example, and functions as working memory for the CPU 130. The program memory 132 is composed of electrically rewritable nonvolatile memory, and stores programs executed by the CPU 130 for the above-mentioned operations and the like, various standard data, etc. The CPU 130 sends various commands for controlling the operation of the projector 10 to the projector 10, using the main memory 131 and the program memory 132.

Figure 5:
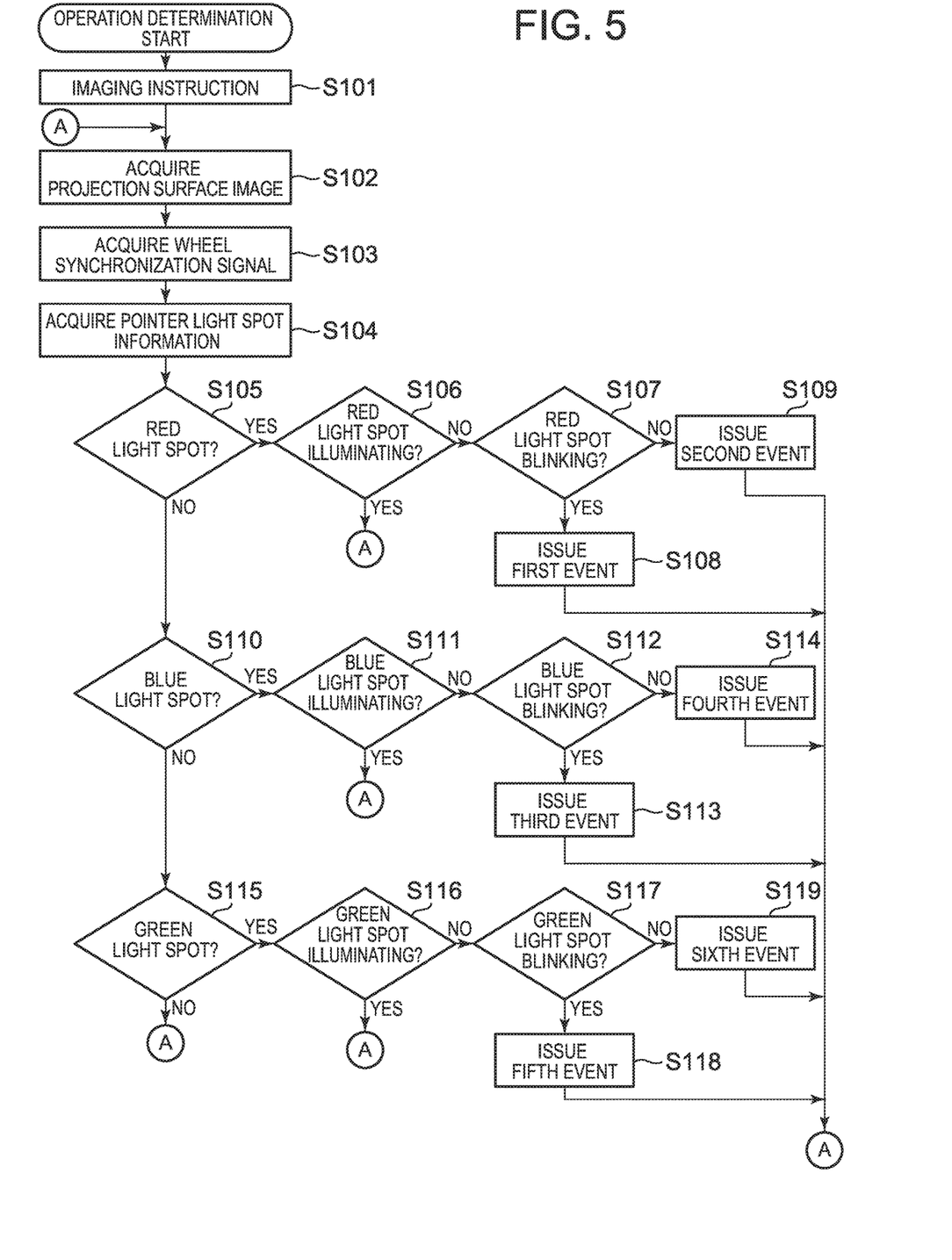
FIG. 5 is a flowchart illustrating an example of operation determination by the control device in the embodiment of the present invention.

FIG. 5 is a flowchart illustrating an example of operation determination in the control device 100 in this embodiment. The following description assumes that the rotational period of the color wheel 22 in the projector 10 is 60 Hertz, and light from the light source 21 is applied to each of the blue, red, and green fields in this order when the color wheel 22 rotates.

The conditions for recognizing the light spot display state (illuminating, blinking, double-blinking) of each of the first pointer 40 and the second pointer 50 by the pointer identification unit 110 may be set beforehand according to pointer specifications. For example, the conditions are set as follows:

Illuminating: a state where light is continuously on for 1 sec or more (1 sec or more continuously on).

Blinking: after the illuminating state, light is continuously off for 0.5 sec (0.5 sec off), followed again by the illuminating state.

Double-blinking: after the illuminating state, light is continuously off for 0.5 sec (0.5 sec off), and then light is continuously on for 0.5 sec (0.5 sec continuously on), and then light is continuously off for 0.5 sec (0.5 sec off), followed again by the illuminating state.

It is assumed here that there is no influence of external light other than the light projected from the projector 10 and the light emitted from each of the first pointer 40 and the second pointer 50.

In step S101, the CPU 130 in the control device 100 sends an imaging instruction to the digital camera 60. For example, the imaging instruction is sent to the digital camera 60 at the same time as the start of the projection of the presentation materials by the projector 10.

The digital camera 60 captures an image of the screen 30 on which the presentation materials are being projected, according to the imaging instruction. For example, the digital camera 60 captures 180 through images per second, in accordance with the frame rate of the projector 10. Here, if the presenter 200 is pointing at the projection surface with the first pointer 40 and/or the audience 300 is pointing at the projection surface with the second pointer 50, the captured image includes not only the projection image by the projector 10 but also the red, blue, or green light spot deriving from the light beam of the first pointer 40 and/or the second pointer 50.

In step S102, the pointer identification unit 110 acquires the captured image from the digital camera 60. The image signal is sent from the digital camera 60 to the pointer identification unit 110.

In step S103, the pointer identification unit 110 acquires a wheel synchronization signal (FIG. 3) from the synchronization signal output unit 13 in the projector 10. The pointer identification unit 110 recognizes which color of pixel is projected onto the screen 30 from the projector 10, from the wheel synchronization signal.

In step S104, the pointer identification unit 110 acquires information about the presence or absence of the light spot of the light beam of each of the first pointer 40 and the second pointer 50 indicating any position on the projection surface and its feature (e.g. color), light spot display state, and position coordinate (X, Y), based on the image signal acquired in step S102 and the wheel synchronization signal acquired in step S103.

Figure 6:
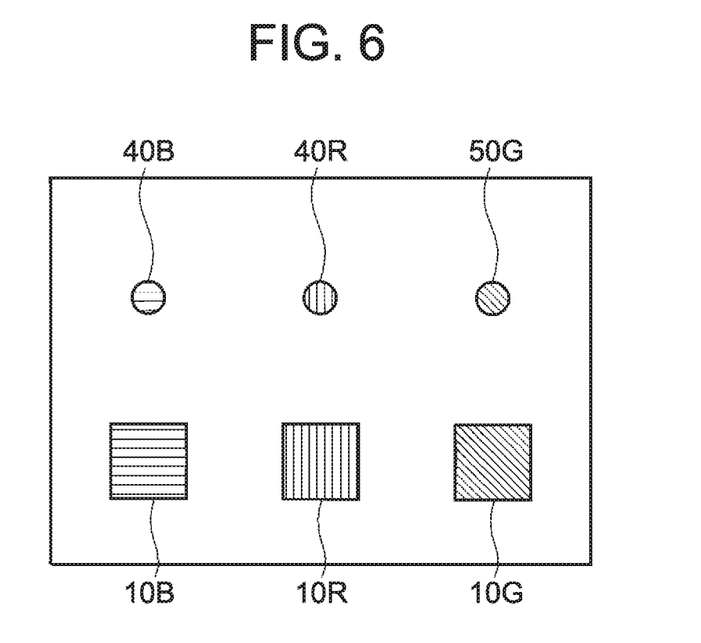
FIG. 6 is a diagram illustrating an example of projection surface image information and pointer indication information.

FIG. 6 is a diagram illustrating an example of projection surface image information and pointer indication information. To explain the concept in this embodiment, three light spots, i.e. a blue light spot 40B and a red light spot 40R from the first pointer 40 and a green light spot 50G from the second pointer 50, are illustrated in FIG. 6. Moreover, a blue image 10B, a red image 10R, and a green image 10G are illustrated as projection surface image information. The projection surface image information illustrated in FIG. 6 is an example of an image viewed by the presenter 200 or the audience 300 with the naked eyes.

Figure 7A:
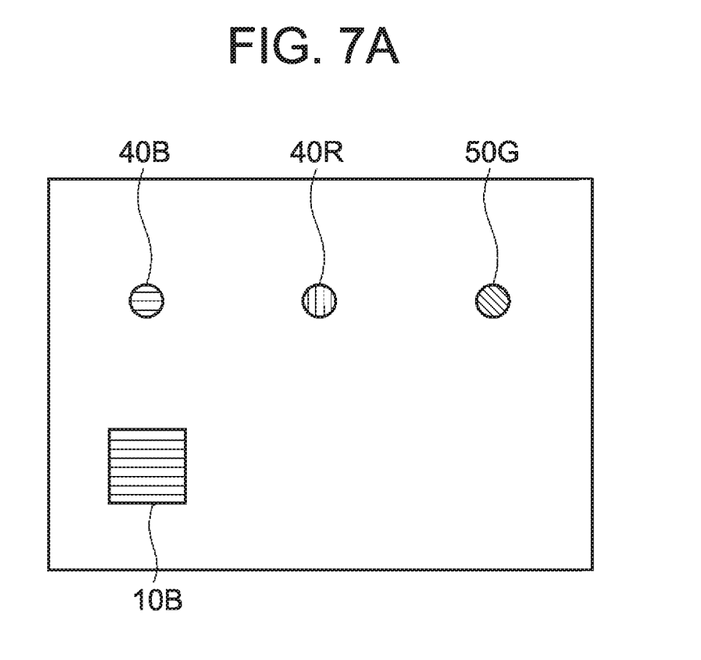
FIG. 7A is a diagram illustrating an example of projection surface image information and pointer indication information captured at the moment when the projector projects blue color.
Figure 7B:
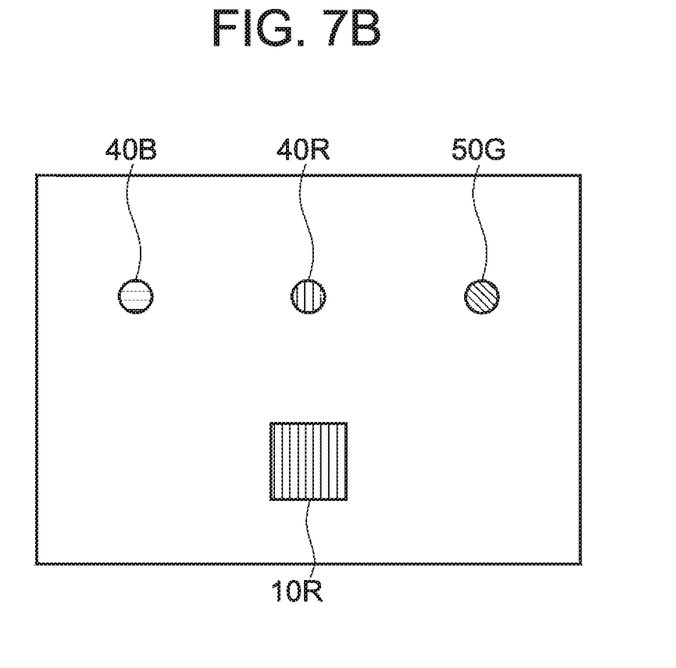
FIG. 7B is a diagram illustrating an example of projection surface image information and pointer indication information captured at the moment when the projector projects red color.
Figure 7C:
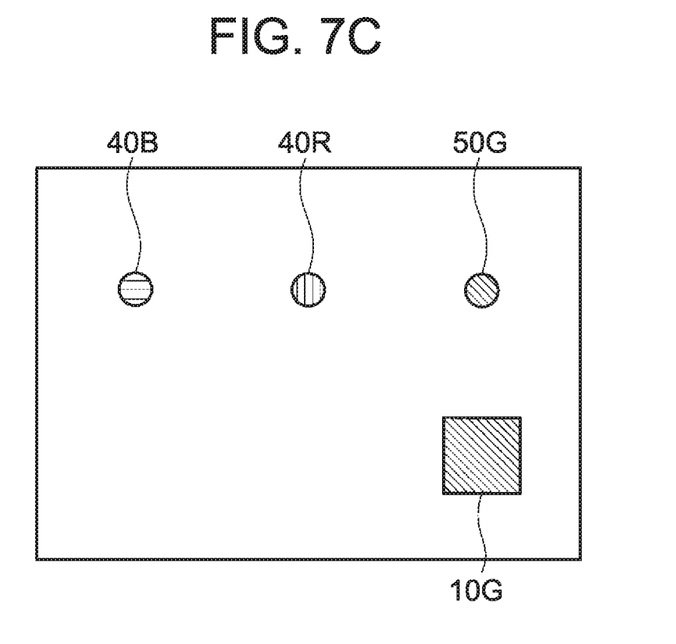
FIG. 7C is a diagram illustrating an example of projection surface image information and pointer indication information captured at the moment when the projector projects green color.

FIGS. 7A to 7C are diagrams illustrating an example of projection surface image information and pointer indication information captured by the digital camera 60 at the moment when the projector 10 projects blue color, red color, and green color, respectively. With reference to the wheel synchronization signal (FIG. 3) output from the synchronization signal output unit 13 in the projector 10, the (3n−2)-th image from among 180 through images per second is an image when only B signal is output (FIG. 7A), the (3n−1)-th image is an image when only R signal is output (FIG. 7B), and the 3n-th image is an image when only G signal is output (FIG. 7C), where n is a natural number from 1 to 60.

In FIG. 7A, of the pixels included in the captured image during B signal output, blue (B) derives from the blue image 10B which is the projection pixel from the projector 10 or the blue light spot 40B from the first pointer 40, but red (R) or green (G), if present, derives not from the projection pixel from the projector 10 but from the red light spot 40R from the first pointer 40 or the green light spot 50G from the second pointer 50.

Likewise, in FIG. 7B, of the pixels included in the captured image during R signal output, red (R) derives from the red image 10R which is the projection pixel from the projector 10 or the red light spot 40R from the first pointer 40, but blue (B) or green (G), if present, derives not from the projection pixel from the projector 10 but from the blue light spot 40B from the first pointer 40 or the green light spot 50G from the second pointer 50.

Likewise, in FIG. 7C, of the pixels included in the captured image during G signal output, green (G) derives from the green image 10G which is the projection pixel from the projector 10 or the green light spot 50G from the second pointer 50, but blue (B) or red (R), if present, derives not from the projection pixel from the projector 10 but from the blue light spot 40B or the red light spot 40R from the first pointer 40.

Based on the above-mentioned concept, the pointer identification unit 110 acquires, for example, information about the presence or absence of the light spot of the light beam of each of the first pointer 40 and the second pointer 50 pointing at any position on the projection surface and its color, light spot display state, and position coordinate (X, Y), from the image signal received from the digital camera 60 and the wheel synchronization signal received from the synchronization signal output unit 13 in the projector 10. In detail, the pointer identification unit 110 acquires the projection surface image including the light spot 40B, 40R, or 50G of the light beam from the pointer 40 or 50, and specifies the feature and state of the light spot 40B, 40R, or 50G included in the image.

For example, the presence or absence of the light spot 40B, 40R, or 50G in the captured image and its color can be identified by the pointer identification unit 110 in the above-mentioned manner. The light spot display state can be identified by the pointer identification unit 110 from through images of several seconds, based on the above-mentioned settings for illuminating, blinking, and double-blinking. The position coordinate can be identified by the pointer identification unit 110, by extracting a color (e.g. blue or green) different from a color corresponding to the wheel synchronization signal (e.g. R signal) from the captured image and specifying its position coordinate.

In step S105 onward, the operation determination unit 120 performs various determination based on the pointer information such as the feature and the state recognized by the pointer identification unit 110 in step S104, and the CPU 130 outputs a control signal to the projector 10 based on the determination result. Thus, the CPU 130, as a display control unit, controls the display operation of the projector 10 according to the feature and state of the light spot.

In step S105, the operation determination unit 120 determines whether or not the pointer identification unit 110 recognizes the red light spot 40R. In the case where the operation determination unit 120 determines that the pointer identification unit 110 recognizes the red light spot 40R (Yes), the process advances to step S106.

In step S106, the operation determination unit 120 determines whether or not the red light spot 40R is illuminating. In the case where the operation determination unit 120 determines that the red light spot 40R is illuminating (Yes), the process returns to step S102. In the case where the operation determination unit 120 determines that the red light spot 40R is not illuminating (No), the process advances to step S107.

In step S107, the operation determination unit 120 determines whether or not the red light spot 40R is blinking. In the case where the operation determination unit 120 determines that the red light spot 40R is blinking (Yes), the process advances to step S108.

In step S108, the CPU 130 issues a first event. For example, a control signal for page forward of the presentation materials is output to the projector 10 as the first event. Thus, for example by the CPU 130 issuing an event corresponding to mouse left click as the first event, the same action as mouse left click is performed in the projection image mouselessly. The first event may be set as appropriate.

In step S107, in the case where the operation determination unit 120 determines that the red light spot 40R is not blinking (No), the process advances to step S109. In detail, in the case where the red light spot 40R is present (step S105: Yes) and the red light spot 40R is neither illuminating or blinking (step S106: No, step S107: No), the operation determination unit 120 determines that the red light spot 40R is double-blinking, and the process advances to step S109.

In step S109, the CPU 130 issues a second event. For example, a control signal for enlarging the display of the projection image by, for example, 30% centering at the position coordinate of the red light spot 40R indicated by the first pointer 40 is output to the projector 10 as the second event. Thus, for example by the CPU 130 issuing an event corresponding to mouse left double click as the second event, the same action as mouse left double click is performed in the projection image mouselessly. The second event may be set as appropriate, too.

In step S105, in the case where the operation determination unit 120 determines that the pointer identification unit 110 does not recognize the red light spot 40R (No), the process advances to step S110.

In step S110, the operation determination unit 120 determines whether or not the pointer identification unit 110 recognizes the blue light spot 40B. In the case where the operation determination unit 120 determines that the pointer identification unit 110 recognizes the blue light spot 40B (Yes), the process advances to step S111.

In step S111, the operation determination unit 120 determines whether or not the blue light spot 40B is illuminating. In the case where the operation determination unit 120 determines that the blue light spot 40B is illuminating (Yes), the process returns to step S102. In the case where the operation determination unit 120 determines that the blue light spot 40B is not illuminating (No), the process advances to step S112.

In step S112, the operation determination unit 120 determines whether or not the blue light spot 40B is blinking. In the case where the operation determination unit 120 determines that the blue light spot 40B is blinking (Yes), the process advances to step S113. In step S113, the CPU 130 issues a third event. The third event may be set as appropriate for controlling the display operation of the projector 10. For example, a control signal for page backward of the presentation materials may be output to the projector 10.

In step S112, in the case where the operation determination unit 120 determines that the blue light spot 40B is not blinking (No), the process advances to step S114. In detail, in the case where the red light spot 40R is not present (step S105: No), the blue light spot 40B is present (step S110: Yes), and the blue light spot 40B is neither illuminating or blinking (step S111: No, step S112: No), the operation determination unit 120 determines that the blue light spot 40B is double-blinking, and the process advances to step S114. In step S114, the CPU 130 issues a fourth event. The fourth event may be set as appropriate for controlling the display operation of the projector 10. For example, a control signal for canceling enlarged display may be output to the projector 10.

In step S110, in the case where the operation determination unit 120 determines that the pointer identification unit 110 does not recognize the blue light spot 40B (No), the process advances to step S115.

In step S115, the operation determination unit 120 determines whether or not the pointer identification unit 110 recognizes the green light spot 50G. In the case where the operation determination unit 120 determines that the pointer identification unit 110 recognizes the green light spot 50G (Yes), the process advances to step S116.

In step S115, in the case where the operation determination unit 120 determines that the pointer identification unit 110 does not recognize the green light spot 50G (No), the process returns to step S102. In detail, in the case where no light spot is present in the captured image, the pointer identification unit 110 again acquires a camera image (step S102) and a wheel synchronization signal (step S103), without the CPU 130 outputting a control signal for controlling the projector 10.

In step S116, the operation determination unit 120 determines whether or not the green light spot 50G is illuminating. In the case where the operation determination unit 120 determines that the green light spot 50G is illuminating (Yes), the process returns to step S102. In the case where the operation determination unit 120 determines that the green light spot 50G is not illuminating (No), the process advances to step S117.

In step S117, the operation determination unit 120 determines whether or not the green light spot 50G is blinking. In the case where the operation determination unit 120 determines that the green light spot 50G is blinking (Yes), the process advances to step S118.

In step S118, the CPU 130 issues a fifth event. For example, a control signal for enlarging the display of the projection image by, for example, 30% centering at the position coordinate of the green light spot 50G indicated by the second pointer 50 is output to the projector 10 as the fifth event. Alternatively, the CPU 130 may output a control signal for increasing or decreasing the volume output from the speaker unit 19 in the projector 10, as the fifth event.

In step S117, in the case where the operation determination unit 120 determines that the green light spot 50G is not blinking (No), the process advances to step S119. In detail, in the case where the red light spot 40R and the blue light spot 40B are both not present (step S105: No, step S110: No), the green light spot 50G is present (step S115: Yes), and the green light spot 50G is neither illuminating or blinking (step S116: No, step S117: No), the operation determination unit 120 determines that the green light spot 50G is double-blinking, and the process advances to step S119.

In step S119, the CPU 130 issues a sixth event. For example, a control signal for canceling enlarged display of the projection image or increased volume or further reducing the display or the volume is output to the projector 10 as the sixth event.

Thus, the CPU 130, as a display control unit and an output control unit, outputs a control signal for controlling the display of the projector 10 to the projector 10, based on the determination result of the operation determination unit 120.

After step S108, S109, S113, S114, S118, or S119, the process returns to step S102. Hence, the operation determination from step S102 onward is repeated while driving the projector 10.

The first to sixth events mentioned above are merely examples, and the events may be interchanged as appropriate or other display operations may be set.

As described above, this embodiment provides the projection system 1 as a display control system that includes: the projector 10 as a display device for displaying information on the display surface; the control device 100 for controlling the display of the projector 10; and the digital camera 60 as an image acquisition device for acquiring an image of the display surface including a light beam from a pointer device (first pointer 40, second pointer 50) capable of emitting a light beam. The control device 100 acquires the image from the digital camera 60 by an acquisition unit, identifies the feature of the light beam included in the image by a feature identification unit, specifies the state of the light beam by a state specification unit, and controls the display operation of the projector 10 based on the feature and state of the light beam by a display control unit.

In this embodiment, the presenter or the audience applies, with the first pointer 40 or the second pointer 50, light to the screen 30 on which the projector 10 is projecting an image, according to need. The digital camera 60 captures the projection surface including the applied light. The pointer identification unit 110 identifies each color based on the color time division mode of the projector 10, thus identifying that the light spot included in the captured image is not the light projected from the projector 10. Thus, even when the same red color is used, the pointer identification unit 110 can distinguish red light projected from the projector 10 and red light emitted from the first pointer 40. The pointer identification unit 110 can distinguish blue light or green light in the same manner.

According to this embodiment, the presenter can perform presentation operation (page forward/page backward, enlargement/reduction, volume control, etc.), while applying a light beam onto the projection surface with his or her first pointer 40. The presenter can thus perform presentation operation easily while staying near the screen 30, without moving to the control device 100 such as a personal computer for operating the presentation materials. In other words, the presenter can control the display operation of the projector 10 by the control device 100 in association with the feature and state of the first pointer 40. The presenter does not need to stop in the middle of the presentation for presentation operation.

In this embodiment, the control device 100 itself can perform function that has previously been performed by a mouse connected to the control device 100, based on the determination on the feature, state, etc. of the pointer. This enables mouseless display operation control using a pointer which is a general-purpose product.

In this embodiment, the first pointer 40 of the presenter is capable of emitting two different colors of light beams, where the authority of operation differs depending on the color of light. In detail, the pointer identification unit 110 identifies a red light spot and a blue light spot included in the captured image, and outputs, to the projector 10, a control signal for controlling the display of the projector 10 according to each light spot. This enables various control for the display of the projector 10 by the control device 100 in conjunction with the first pointer 40.

In this embodiment, the audience has the second pointer 50. By applying the light beam of his or her second pointer 50 to the contents of interest in the presentation, the audience can enlarge and check the contents. The audience can thus control the display operation of the projector 10 by the control device 100 in association with the feature and state of the second pointer 50.

In the case where the pointer identification unit 110 recognizes both features of the first pointer 40 of the presenter and the second pointer 50 of the audience, the CPU 130 varies the authority for each feature of the light spot of the light beam emitted from the pointer 40 or 50, and determines the priority level of the authority for the pointer having the corresponding feature. More appropriate presentation operation can be realized in this way.

For example, even when the audience drives the second pointer 50 while the presenter is driving the first pointer 40, the presentation materials are kept from being operated by the audience. Any operation on the presentation materials against the presenter's intention is thus prevented. For example, the second pointer 50 is not assigned page forward function, etc. but assigned only enlargement/reduction function, with it being possible to prevent page forward/page backward of the presentation materials against the presenter's intention.

Although the above describes the case where the first pointer 40 can emit a red light beam and a blue light beam and the second pointer 50 can emit a green light beam, the color(s) of light emitted by each pointer is not limited to such, as long as each light spot included in the image of the screen 30 captured by the digital camera 60 is identifiable by the pointer identification unit 110. For example, the concept of the present invention is applicable even in the case where the first pointer 40 and the second pointer 50 both emit red light beams, if these red light beams differ in wavelength and are identifiable from the captured image.

In detail, even in the case where the first pointer 40 and the second pointer 50 emit the same red light, if these light beams are distinguishable, operation such as click operation or enlargement/reduction operation can be assigned to each pointer depending on the identified feature and the like. In the case where light beams emitted from a plurality of pointers have the same color, for example, the identification process by the pointer identification unit 110 may be changed depending on the region of the captured image. For example, red light beams deriving from two pointers can be distinguished by changing the identification process between the right-half region and the left-half region of the captured image. The distinction is also possible if the shape or size of the light spot of each pointer on the projection surface is different or any light contains blinking unrecognizable by the naked eyes. If each light has a feature in shape, size, etc., they can be distinguished by pattern matching as an example, even when color time division is not performed.

Although the above describes the case where the presenter has the first pointer 40 capable of emitting two different colors of light beams and the audience has the second pointer 50 capable of emitting one color of light beam different from the colors of the first pointer 40 as a pointer device, the number of colors of light and the number of pointers are not limited to such. For example, the concept of the present invention is applicable even in the case where the audience has no pointer and only the presenter has a pointer capable of emitting a plurality of colors or a plurality of wavelengths of light, and the control device 100 performs operation for controlling the display of the projector 10 based on the feature and state of the pointer.

In the case where the control device 100 is a tablet terminal or a smartphone and the projector 10 projects information from the terminal or the like, operation such as slide and flick corresponds to the above-mentioned mouse operation (click, etc.).

Although the above describes the case where the projector 10 as a display device is a DLP projector and the pointer identification unit 110 acquires the wavelength or color of each light beam on the projection surface of the screen, the concept of the present invention is also applicable to a projection surface from a projector other than a DLP projector or to a display surface (display surface other than a projection surface) in a display device such as a liquid crystal display, as long as the wavelength or color of each light beam can be acquired from the display surface on the screen captured by the digital camera 60.

The present invention is not limited to the above embodiment, and various changes are possible without departing from the scope of the invention in the implementation stage. Embodiments may be combined as appropriate, and the advantageous effects of the combination can be achieved in such a case. Further, the embodiment includes various inventions, and various inventions can be extracted by combinations selected from a plurality of constituent features disclosed herein. For example, in the case where the problem stated can be solved and the advantageous effect can be achieved even when some of the constituent features described in the embodiment are omitted, structures from which such constituent features are omitted can also be extracted as inventions.

What is claimed is:

1. A display control device comprising:
 a processor configured to perform processes comprising:
  an acquisition process of acquiring color switching timing information when a mixed color image is formed on a projection surface by switching a color of a unicolor image to be projected on the projection surface for each of a predetermined number of fields;
  a first determination process of determining a color of a unicolor image being projected at a determination timing based on the color switching timing information acquired in the acquisition process;

a second determination process of determining whether or not an optical image of a color different from the color of the unicolor image determined in the first determination process is formed on the projection surface at the determination timing based on a captured image obtained by imaging the projection surface; and a control process of carrying out display control according to the color of the optical image in response to a determination in the second determination process that the optical image is formed on the projection surface, wherein, in response to a determination in the second determination process that a plurality of optical images of different colors are simultaneously formed on the projection surface, the control process carries out multiple different types of predetermined display control with respect to the different colors, each of the different types of predetermined display control corresponding to a respective one of the different colors and being associated with a predetermined priority level of the respective one of the different colors to which it corresponds.

2. The display control device according to claim 1, wherein the processes further comprise a third determination process of determining, in response to a determination in the second determination process that the optical image is formed on the projection surface, whether the optical image is in a blinking state, and wherein the control process carries out a predetermined display control in response to a determination in the third determination process that the optical image is in the blinking state.

3. The display control device according to claim 1, wherein the display control comprises display control of the mixed color image.

4. The display control device according to claim 1, wherein the optical image comprises light emitted from a pointer toward the projection surface.

5. A projection system comprising:

a projector; and a display control device comprising a processor configured to perform processes comprising:

an acquisition process of acquiring color switching timing information when a mixed color image is formed by the projector on a projection surface by switching a color of a unicolor image to be projected on the projection surface for each of a predetermined number of fields;

a first determination process of determining a color of a unicolor image being projected at a determination timing based on the color switching timing information acquired in the acquisition process;

a second determination process of determining whether or not an optical image of a color different from the color of the unicolor image determined in the first determination process is formed on the projection surface at the determination timing based on a captured image obtained by imaging the projection surface; and a control process of carrying out display control according to the color of the optical image in response to a determination in the second determination process that the optical image is formed on the projection surface, wherein, in response to a determination in the second determination process that a plurality of optical images of different colors are simultaneously formed on the projection surface, the control process carries out multiple different types of predetermined display control with respect to the different colors, each of the different types of predetermined display control corresponding to a respective one of the different colors and being associated with a predetermined priority level of the respective one of the different colors to which it corresponds.

6. A non-transitory computer-readable storage medium having stored thereon a program executable by a computer of a control device, the program controlling the computer to perform functions comprising:

an acquisition process of acquiring color switching timing information when a mixed color image is formed on a projection surface by switching a color of a unicolor image to be projected on the projection surface for each of a predetermined number of fields;

a first determination process of determining a color of a unicolor image being projected at a determination timing based on the color switching timing information acquired in the acquisition process;

a second determination process of determining whether or not an optical image of a color different from the color of the unicolor image determined in the first determination process is formed on the projection surface at the determination timing based on a captured image obtained by imaging the projection surface; and a control process of carrying out display control according to the color of the optical image in response to a determination in the second determination process that the optical image is formed on the projection surface, wherein, in response to a determination in the second determination process that a plurality of optical images of different colors are simultaneously formed on the projection surface, the control process carries out multiple different types of predetermined display control with respect to the different colors, each of the different types of predetermined display control corresponding to a respective one of the different colors and being associated with a predetermined priority level of the respective one of the different colors to which it corresponds.

7. The display control device according to claim 1, wherein the predetermined priority levels of the different colors are associated with respective different types of predetermined display control.

8. The display control device according to claim 7, wherein the different types of predetermined display control include a page forward/backward operation and an enlargement/reduction operation.

* * * * *